United States Patent
Kinoshita et al.

(10) Patent No.: US 7,989,106 B2
(45) Date of Patent: Aug. 2, 2011

(54) BIPOLAR BATTERY CELL AND ASSEMBLED BATTERY FOR A VEHICLE

(75) Inventors: Takuya Kinoshita, Yokosuka (JP); Hideaki Horie, Yokosuka (JP); Takaaki Abe, Yokohama (JP); Osamu Shimamura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 414 days.

(21) Appl. No.: 10/573,462

(22) PCT Filed: Nov. 1, 2005

(86) PCT No.: PCT/IB2005/003259
§ 371 (c)(1),
(2), (4) Date: Mar. 24, 2006

(87) PCT Pub. No.: WO2006/048732
PCT Pub. Date: May 11, 2006

(65) Prior Publication Data
US 2008/0248335 A1    Oct. 9, 2008

(30) Foreign Application Priority Data
Nov. 2, 2004 (JP) .................. 2004-319334

(51) Int. Cl.
H01M 2/26 (2006.01)
H01M 2/28 (2006.01)
H01M 4/02 (2006.01)
H01M 4/13 (2006.01)
H01M 6/12 (2006.01)
H01M 6/46 (2006.01)
H01M 6/48 (2006.01)
H01M 10/18 (2006.01)

(52) U.S. Cl. ........ 429/211; 429/152; 429/161; 429/162; 429/210

(58) Field of Classification Search .................... 429/210
See application file for complete search history.

(56) References Cited

U.S. PATENT DOCUMENTS
2001/0019794 A1 * 9/2001 Horie et al. .................... 429/90
(Continued)

FOREIGN PATENT DOCUMENTS
EP    1 130 672    9/2005
(Continued)

OTHER PUBLICATIONS
Circuit. (n.d.). Dictionary.com Unabridged. Retrieved Mar. 10, 2010, from Dictionary.com website: http://dictionary.reference.com/browse/circuit.*

(Continued)

Primary Examiner — Basia Ridley
Assistant Examiner — Sean P Cullen
(74) Attorney, Agent, or Firm — Young Basile

(57) ABSTRACT

The invention relates to a bipolar battery cell having a built-in discharge circuit that can automatically balance the charged conditions. The bipolar battery cell includes a plurality of bipolar electrodes, each including a collector having a positive-electrode layer on one surface and a negative-electrode layer on another surface. The bipolar battery cell further includes a plurality of electrolyte layers that exchange ions between the bipolar electrodes; and a discharge circuit that electrically conducts adjacent bipolar electrodes. The discharge circuit is provided on the same surface of at least one layer of the positive-electrode layers, the negative-electrode layers, or the electrolyte layers. Multiple bipolar battery cells are combined to form an assembled battery for vehicular applications.

20 Claims, 13 Drawing Sheets

U.S. PATENT DOCUMENTS

2003/0205775 A1\* 11/2003 Einthoven et al. .............. 257/497
2004/0038123 A1    2/2004 Hisamitsu et al.

FOREIGN PATENT DOCUMENTS

| | | | |
|---|---|---|---|
| EP | 1 577 973 | | 9/2005 |
| JP | 02044660 A | \* | 2/1990 |
| JP | 07-302619 | | 11/1995 |
| JP | 2001-250591 | | 9/2001 |
| JP | 2004-055294 | | 2/2004 |
| JP | 2004055294 A | \* | 2/2004 |
| JP | 2004-087238 | | 3/2004 |
| JP | 2004-253155 | | 9/2004 |

OTHER PUBLICATIONS

English language abstract of JP 02044660 A, Nakanaga et al., Feb. 1990.\*

Fukuzawa et al., Machine translation of JP 2004055294 A, Feb. 2004.\*

Notification of Transmittal of the International Search Report and the Written Opinion for corresponding International Application No. PCT/IB2005/003259, mailed Feb. 21, 2006, 16 pages.

\* cited by examiner

BIPOLAR BATTERY CELL AND ASSEMBLED BATTERY FOR A VEHICLE

This application is a National Stage filing under 35 USC 371 of International Application No. PCT/IB2005/003259, filed Nov. 1, 2005, which claims priority to Japanese Patent Application No. 2004-319334, filed Nov. 2, 2004, the entire contents of each of which is incorporated herein by reference.

TECHNICAL FIELD

The invention relates to batteries and, in particular, batteries for use in vehicles.

BACKGROUND

A bipolar battery is a battery constructed with a plurality of bipolar electrodes, and has excellent properties, such as light, thin, and preferable heat radiation.

When a bipolar battery is used as a source of power for a vehicle, reliability and stability are required. If the charging capacity of a plurality of electric cells of the bipolar batteries (an electric cell is developed between each of the bipolar electrodes) differs, the required output performance and capacity performance cannot be given. Therefore, the charged conditions of each electric cell need to be equally maintained at all times.

For that purpose, a charge and discharge system of each electric cell is controlled individually by connecting a voltage detecting wire (used for detecting voltage of an electric cell) and a bypass wire (used for bypassing an electric cell) for each electric cell. The connection of the bypass wire is controlled depending on the voltage detected by the voltage connection wires.

However, voltage detecting wires and bypass wires are undesirable in that the voltage detecting wires and bypass wires have to be drawn from each current collector provided between the bipolar electrodes, which often requires long man-hours. Moreover, sealability of the sheathing materials has to be ensured.

SUMMARY

A bipolar battery cell for a vehicle is described that has a built-in discharge circuit that can automatically balance the charged conditions without using voltage detecting wires and bypass wires. Furthermore, an assembled bipolar battery for a vehicle is formed from a plurality of the bipolar battery cells.

The bipolar battery cell comprises a plurality of laminated bipolar electrodes. On one surface of a collector, a positive-electrode layer is developed. On the other surface, a negative-electrode layer is developed. A plurality of electrolyte layers, which exchange ions between the relevant bipolar electrodes, are laminated one after the other. A discharge circuit is provided that electrically conducts the adjacent bipolar electrodes. The discharge circuit may be provided on the same surface of at least one layer of the positive-electrode layers or negative-electrode layers, or on the electrolyte layers.

In one embodiment, the bipolar battery cell can automatically balance the charged conditions depending on the voltage of each electric cell without drawing out voltage detecting wires and bypass wires because the discharge circuit is provided on the same surface of at least one layer of the positive-electrode layers or negative-electrode layers or the electrolyte layers.

The bipolar battery cell can automatically balance the charged conditions without drawing out voltage detecting wires and bypass wires because the discharge circuit that electrically conducts the adjacent bipolar electrodes is provided on the same surface of at least one layer of the positive-electrode layers or negative-electrode layers of the current collector, or the electrolyte layers. As a result, the work efficiency for manufacture and the reliabilities of the battery may be improved.

In one embodiment, a bipolar battery cell is described having a built-in discharge circuit that can automatically balance the charged conditions. The bipolar battery cell includes a plurality of bipolar electrodes, each including a collector having a positive-electrode layer on one surface and a negative-electrode layer on another surface. The bipolar battery cell further includes a plurality of electrolyte layers that exchange ions between the bipolar electrodes; and a discharge circuit that electrically conducts adjacent bipolar electrodes. The discharge circuit is provided on the same surface of at least one layer of the positive-electrode layers, the negative-electrode layers, or the electrolyte layers.

In another embodiment, an assembled battery includes a plurality of the bipolar battery cells.

In another embodiment, a vehicle includes the assembled battery of one or more of the bipolar battery cells and a controller.

In another embodiment, a method of forming a bipolar battery cell comprises laminating a plurality of bipolar electrodes, each including a collector having a positive-electrode layer on one surface and a negative-electrode layer on another surface. The method further comprises laminating a plurality of electrolyte layers that exchange ions between the bipolar electrodes, and laminating a discharge circuit that electrically conducts adjacent bipolar electrodes.

In another embodiment, a bipolar battery cell comprises a plurality of bipolar electrodes, each including a collector having a positive-electrode layer on one surface and a negative-electrode layer on another surface. The bipolar battery cell further comprises a means for exchanging ions between the bipolar electrodes, and a means for discharging the bipolar battery cell by electrically conducting adjacent bipolar electrodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
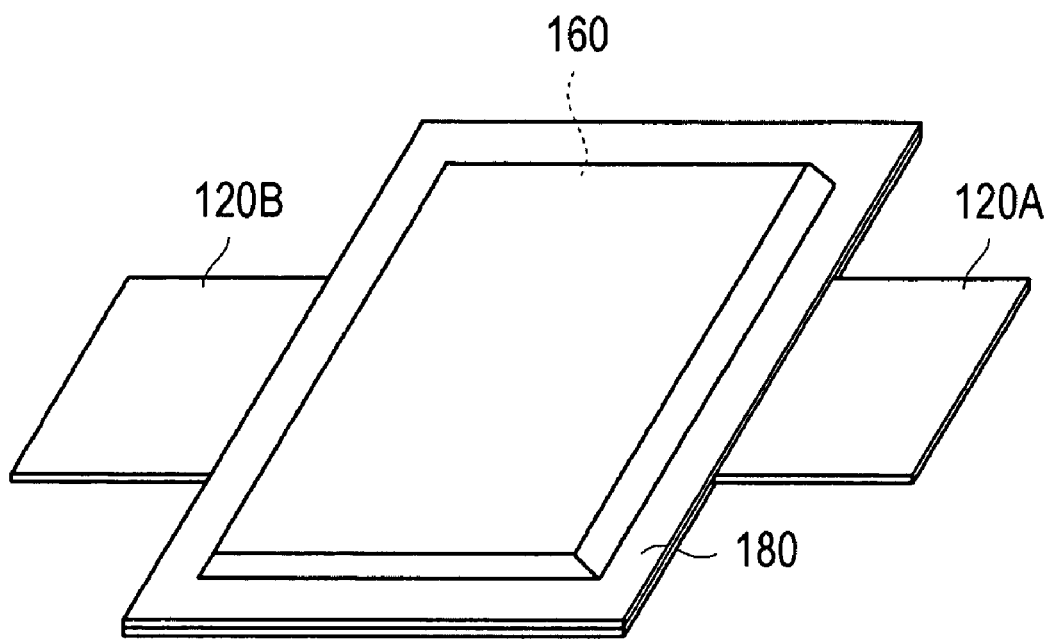
FIG. 1 is a perspective diagram of a bipolar battery cell relating to the mode for carrying out the invention.

Detailed descriptions of a bipolar battery cell, an assembled battery and a vehicle equipped with the assembled battery are given based on drawings. In the drawings, the thickness and shape of each layer to construct the bipolar battery are drawn in an exaggerated form. However, this is to provide better understanding of the subject-matter of the invention, and the drawings are not meant to be consistent with the thickness and shape of each layer of the bipolar battery.

FIG. 1 is a schematic diagram of a bipolar battery cell 100. An example bipolar battery cell 100, as shown in FIG. 1, has a flat rectangular form. From both ends of the bipolar battery cell 100, a positive electrode tab 120A, and a negative electrode tab 120B are drawn out so as to absorb electricity. A power generating element 160 is wrapped with a sheathing material 180 (for example, a laminated film) of the bipolar battery cell 100, and the circumference of the element is heat-sealed.

Figure 2:
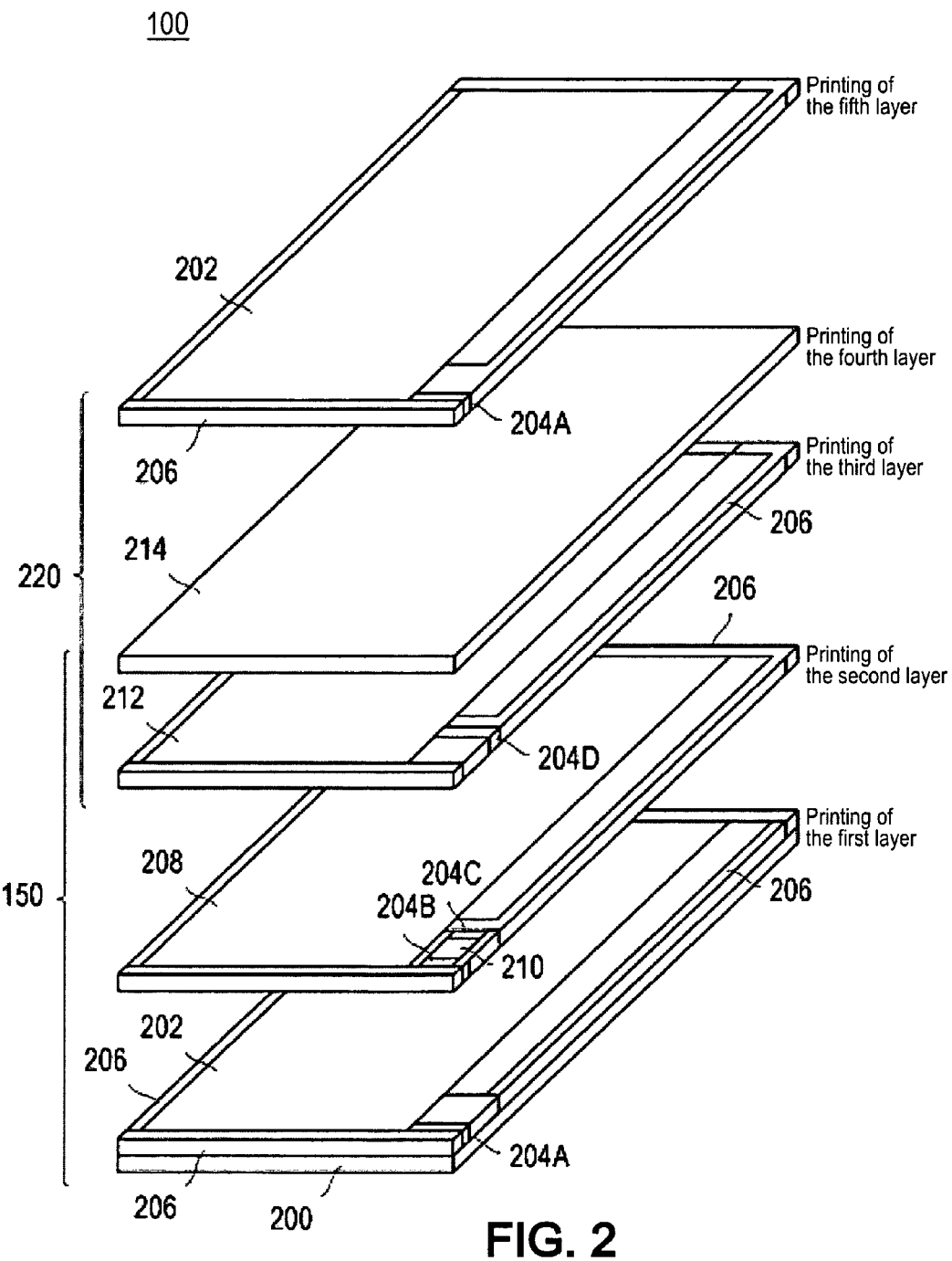
FIG. 2 is a perspective diagram of the interior of the bipolar battery cell.
Figure 3:
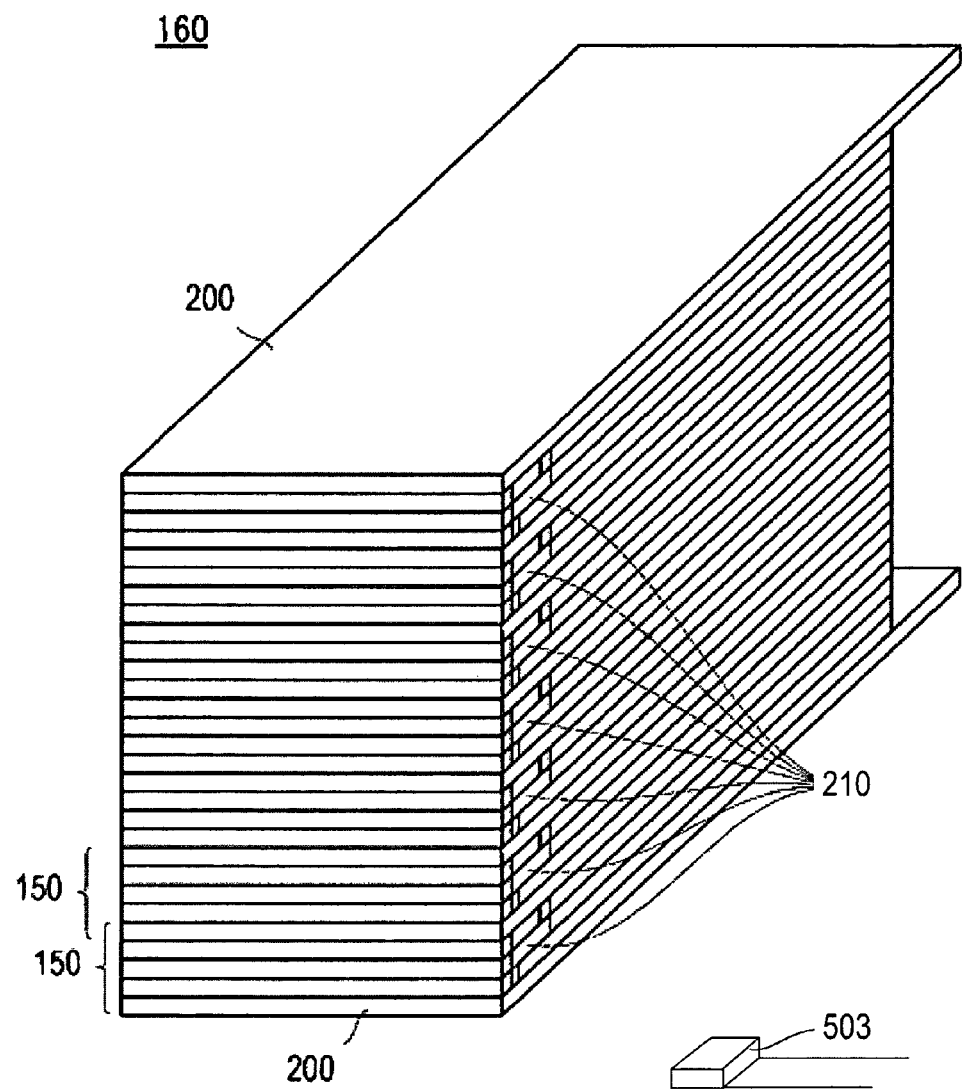
FIG. 3 is a perspective diagram of the interior of the bipolar battery cell.

FIGS. 2 and 3 illustrate an interior of the bipolar battery cell 100, and FIG. 4-9 illustrate a discharge circuit of a bipolar battery built into the bipolar battery cell 100. The bipolar battery cell 100 may be manufactured by discharging materials required to develop each layer from a plurality of nozzles, just as printing picture images with an ink-jet printer, as if to paint pictures on each layer one by one all the way from the bottom to the top. In addition, the bipolar battery cell 100 is provided with a discharge circuit, which is also drawn using the printing method.

FIG. 2 is an exploded perspective view to explain the interior of the bipolar battery cell 100. In the figure, each layer is decomposed as a matter of explanatory convenience; however, layers can not be decomposed practically because, in the mode for carrying out the invention, each layer is painted one by one from the bottom to the top layers using the printing method.

The materials for each layer of bipolar battery cell 100 are as follows.

Preparation of positive ink, used to develop the positive-electrode active material 212, comprises LiMn2O4 (85 wt %) as a positive-electrode active material, acetylene black (5 wt %) as a conductive auxiliary agent, and PVdF (10 wt %) as a binder. NMP is used as a slurry viscosity modifier to modify the ink viscosity.

The positive-electrode layer is a layer which is developed with an active material, conductive auxiliary agent if need arises, binder, and electrolyte mixed together. The active material is not restricted in the embodiment. Examples of positive-electrode active materials include compounds in the Li—Mn system such as LiMn2O4, compounds in the Li—Ni system such as LiNiO2, compounds in the Li—Co system such as CoO2, and iron phosphate compounds such as Li—FePO4. Among these, compounds in the Li—Mn system are most preferred from the perspective of excellence in conductivity. In some cases, more than one positive-electrode active material can be used. Here at the materials of an Li battery are taken as an example, but carbon can be used as a capacitor. Also, materials of a water electrolytic battery, such as nickel hydroxide, plumbic oxide, and lead sulfate can be used. Materials which are high conductive and hardly decomposed by an electric current, such as carbon material like carbon black, and powdered graphite; gold, and platinum are used for the conductive auxiliary agent. Examples of the binder include polyvinylidene fluoride (PVdF), styrene-butadiene rubber (SBR), polytetrafluoroethylene (PTFE), polyolefin, polyimide, polyamide-imide, and polyurethane. Electrolyte is a mixture of an ion-conductive polymer and supporting electrolyte. The ion-conductive polymer is not restricted in the embodiment. Polymers of polyethylene oxide (PEO) and polypropylene oxide (PPO) can be taken as examples. The ion-conductive polymer contained in the active material layer can be the same as or different from that used as an electrolyte of a battery to which the electrode of the invention is applied, but it is preferable to be the same. Examples of the supporting electrolyte include LiBETI (Lithium Bis(trifluoromethanesulfonyl)imide; Li(C2F5SO2)2N), LiPF6, LiBF6, LiClO4, LiASF6, and LiCF3SO3.

Preparation of Negative Ink, Used to Develop the Negative-Electrode Active Material 202, comprises hard carbon (90 wt %) as the negative-electrode active material, and PVdF (10 wt %) as the binder. NMP is used as a slurry viscosity modifier to modify the ink viscosity.

The negative-electrode layer is a layer which is developed with an active material, conductive auxiliary agent if need arises, binder, and electrolyte mixed together. Examples of the negative-electrode active material include crystalline and non-crystalline carbon materials. To be more precise, carbon-graphite materials such as natural graphite and artificial graphite, carbon black, activated charcoal, carbon fiber, coke, soft carbon, and hard carbon can be used. Among these, hard carbon is most preferred from the perspective of battery control. Carbon materials are most preferred from the capacitor. Hydrogen storing alloy, cadmium hydroxide, and lead sulfate can be used for the water electrolytic battery.

Preparation of electrolytic ink, used to develop the ion-conductive material 208, comprises PC-EC 1MLiBETI (90 wt %) as electrolytic solution, and PVdF-HFP (10 wt %) containing 10% of HFP copolymer. Dimethyl carbonate (DMC) is used as a slurry viscosity modifier to modify the ink viscosity.

The electrolyte layer can be any one of a liquid layer, gel layer, or solid layer. A gel polymer electrolyte layer, or all-solid electrolyte layer is desirable considering the safety and prevention of liquid junction in the case of battery damage. Using the gel polymer electrolyte layer for the electrolyte reduces the flowability of the electrolyte, and prevents the electrolyte from flowing into the current collector so that ion conductivity between each layer can be eliminated. Examples of a host polymer of the gel electrolyte include PEO, PPO, PVdF, polyvinylidene fluoride-hexafluoropropylene copolymer (PVdF-HFP), PAN, PMA, PMMA. It is desirable that supporting electrolyte is contained so as to ensure the ion-conductivity. If the battery is a lithium secondary battery, LiBF4, LiPF6, LiN(SO2CF3)2, LiN(SO2C2F5)2, or mixtures of these compounds can be used for the supporting electrolyte. However, they are not limited to these. As stated above, polyalkylene oxide polymer such as PEO and PPO well solve lithium salt such as LiBF4, LiPF6, LiN(SO2CF3)2, and LiN(SO2C2F5)2. Also, cross-bridging structures will realize excellent mechanical strength.

Preparation of ink for conductive body, used to develop the conductive body 200, 204, 204A, and 214, comprises graphite (average particle diameter 0.8 m; 90 wt %), which is a carbon particle, as a conductive particle, and PVdF (10 wt %) as the binder. NMP is used as the viscosity modifier so as to prepare ink for the current collector which contains conductive particles.

The conductive body only has to be provided with conductivity, and is not restricted in the embodiment. Examples of the conductive body include an aluminum particle, SUS particle silver particle, gold particle, titanium particle, but not limited. An alloy particle can be sued. Polyethylene (PE), polypropylene (PP), polytetrafluoroethylene (PTFE), styrene-butadiene rubber (SBR), polyacrylonitrile (PAN), polymethyl acrylate (PMA), polymethyl methacrylate (PMMS), polyvinyl chloride (PVC), polyvinylidene fluoride (PVdF) or mixtures of these compounds can be used for the binder. Electronically high-conductive high-polymer materials (conductive polymer) should be only used, and conductive particles do not necessarily have to be contained. Examples of the conductive polymer include polyaniline, polypyrrole, polythiophene, polyacethylene, polyparaphenylene, phenylene vinylene, polyacrylonitrile, polyoxadiazole or mixtures of these compounds.

Preparation of insulant ink, used to develop the insulant 206, comprises PVdF-HFP (10 wt %) containing 10% of HFP copolymer as a host polymer. Dimethyl carbonate (DMC) is used as a slurry viscosity modifier to modify the ink viscosity.

The insulant only has to be provided with conductivity, and is not restricted in the embodiment. For example, high-polymer materials used to develop the gel polymer electrolyte layer can be preferably used. Examples of the insulant include PEO, PPO, PVdF, polyvinylidene fluoride-hexafluoropropylene copolymer (PVdF-HFP), PAN, PMA, PMMA.

Positive electrode tab 120A and negative electrode tab 120B are made from an AL panel. It is desirable to be a low resistant material to absorb the electric current, and for the thickness to be approx. 100 μm.

The ink was applied using an inkjet method according to the following procedure. So as to prevent problems where the plastic parts installed in the ink spraying portion of the ink-jet printer melt, the parts installed in the ink spraying portion was replaced with metal parts so that the ink could be directly provided to the metal parts from the inkholders. Also, so as to prevent deposition of the active material in the ink, the ink deposit was agitated with rotors. The ink-jet printer was controlled with a computer and software available in the market. The ink was applied by printing picture images with an ink-jet printer according to the pattern created on the computer.

Power generating element 160 is developed by overpainting the predetermined adhesion patterns using the inkjet printing method. In the mode for carrying out the invention, as shown in FIG. 2, the predetermined adhesion patterns, shown in the first layer to the fifth layer, are overpainted on a base material 200 one by one all the way from the bottom to the top layers just as printing color picture images with an ink-jet printer so as to develop an electric cell 150. Also, a power generating element 160, as shown in FIG. 3, is created by repeatedly laminating the electric cell 150 seven times.

In other words, a negative-electrode active material 202 is printed in the midsection on a conductive body 200 as a base material as shown in FIG. 2. At the same time, a conductive body 204 is printed in some part, and an insulant 206 is printed on the outer periphery. Adhesion patterns are predetermined for each layer, such as on what part of the conductive body 200 the negative-electrode active material 202, the conductive body 204A, and the insulant 206 are printed. A printer that controls injection of the materials selectively injects conductive bodies and insulants in each position according to the adhesion patterns.

After the printing of the first layer is completed, the printing of the second layer is commenced. In the midsection of the second layer, an ion conduction material 208, as an electrode layer which exchanges lithium ions, and at the same time, conductive bodies 204B, 204C are printed. In addition, insulant 206 is printed on the outer periphery. A discharge circuit 210 is provided on the same surface of the second layer so as to be sandwiched between the conductive bodies 204B and 204C. The discharge circuit 210 is switched on or off depending on voltage of the electric cell 150. Descriptions of the structure of the discharge circuit 210 are subsequently given based on FIG. 4 and later.

After the printing of the second layer is completed, the printing of a third layer is commenced. In the midsection of the third layer, a positive-electrode active material 212 that develops the positive-electrode layer of the bipolar electrode is printed. At the same time, a conductive body 204D is printed, and the insulant 206 is printed on the outer periphery.

After the printing of the third layer is completed, the printing of a fourth layer is commenced. On the whole surface of the fourth layer is a conductive body 214 which will be a current collector.

After the printing of the fourth layer is completed, the printing of a fifth layer is commenced. Above the fourth layer, the printing of the fifth layer is printed. The printing of the fifth layer is the same as the printing of the first layer. In fact, a negative-electrode active material 202 that develops the negative-electrode layer of the bipolar electrode is printed in the midsection of the fifth layer. At the same time, a conductive body 204A is printed, and the insulant 206 is printed on the outer periphery.

In addition, the conductive body 200, conductive body 214 in the fourth layer, and the layer between these conductive bodies become the electric cell 150. The third layer through the fifth layer becomes the bipolar electrode 220.

By repeating the above printing seven times in total, a power generating element 160 as shown in FIG. 3 can be formed. The conductive body 200, which is a base material of a bottom layer of the power generating element 160, is connected to the negative electrode tab 120B (FIG. 1). Conductive body 200, which is a base material of a top layer, is connected to the positive electrode tab 120A (FIG. 1). In this example, the power generating element 160 is connected in series to form power generating element 160, the voltage which is seven times as high as that of the electric cell 150 occurs between the positive electrode tab 120A and the negative electrode tab 120B.

The discharge circuit 210 is provided in each electric cell of the power generating element 160 formed as described as above. The discharge circuit 210 is provided with functions to electrically conduct the adjacent bipolar electrodes 220 in a lamination direction. The sealability and reliability of the sheathing material 180 may be improved by having the discharge circuit 210 built into the power generating element 160 because the voltage detecting wire used for detecting voltage of the electric cell 150 and the bypass wire used for bypassing the electric cell 150 will not need to be drawn out from the interior of the bipolar battery 100. As a matter of course, the work efficiency for assembly can be improved, and cost reduction can be achieved because the number of components may be reduced without using voltage detecting wires and bypass wires. Furthermore, reliabilities may be improved in providing electrical isolation because electrical isolation for each voltage detecting wire and bypass wire will not be needed in the interior and exterior of the bipolar battery cell 100 so that there will be reduced prospects of the failure, such as internal shorts. Moreover, the installation area of the bipolar battery cell 100 can be miniaturized because another group of discharge circuits (regulator circuits to balance the charged conditions) need not be provided in the exterior of the bipolar battery cell 100.

In one embodiment, the discharge circuit 210 is provided on the same surface of the layer on which ion conduction material 208 is provided. However, the discharge circuit can be on the same surface of the layer on which the negative-electrode active material 202 or the positive-electrode active material 212 is printed instead. Alternatively, the discharge circuit can be formed over a plurality of layers.

The discharge circuit 210 may be provided with a function to set the threshold of the discharge voltage. Discharge circuit 210 aggressively discharges, making the positive side and the negative side of the electric cell 150 electrically conductive, when the voltage of the electric cell 150 has reached the threshold, and does not aggressively discharge when the voltage of the electric cell 150 has not reached the threshold. In addition, the electric cell 150 is detected via the conductive bodies 204A through 204D, which electrically conduct with each other.

Figure 4:
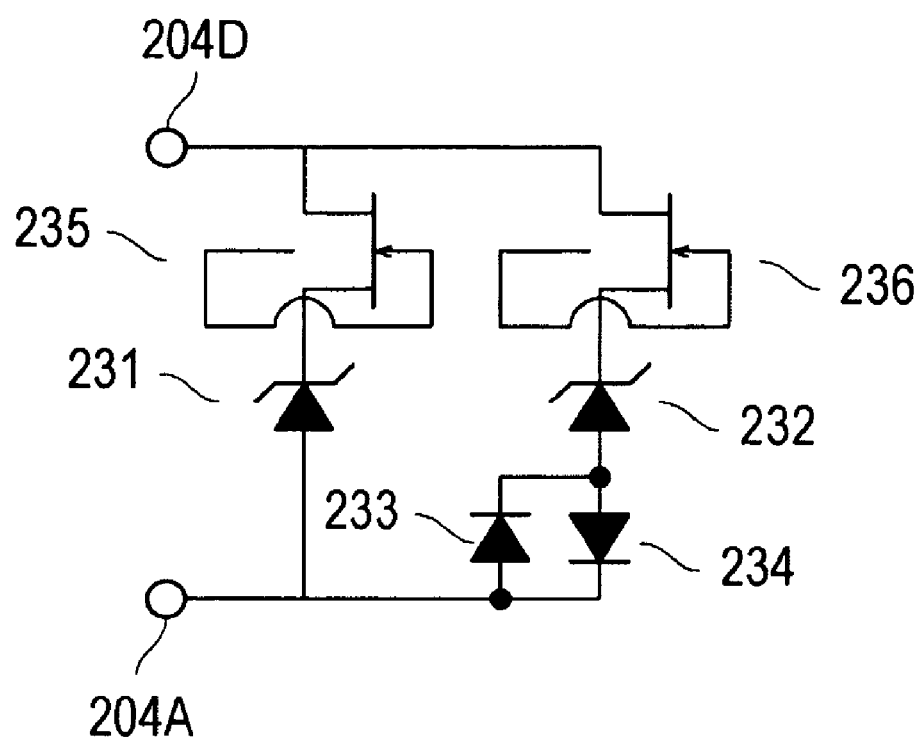
FIGS. 4-9 are exemplary diagrams of a discharge circuit built into a bipolar battery cell.

As shown in FIG. 4, the discharge circuit 210 may be provided with the Zener diodes 231, 232 which set the threshold of the discharge voltage. The threshold of the discharge voltage may be set between 3.6 V-4.1 V. In the discharge circuit 210, when it is electrically conductive, the electric current flows, which is more than 100 times as high as that when it is not electrically conductive. The threshold of the discharge voltage to this range is set because, if the operating voltage range is set between 3.0 V-4.2 V, after detecting the electric cells of their full capacities depending on the voltage, in the case of an electric automobile that charges and discharges to the fullest extent, it can equalize the voltage by discharging electric cells which have a voltage of higher than 4.1 V. In the case of a hybrid vehicle that is operated only at half capacity of the electric cells, discharge circuit 210 can equalize the voltage by discharging electric cells which have a voltage of higher than 3.6 V.

The discharge circuit comprises a organic semiconductor layer which is acenic, thiophenic, phenylene, metal-substituted phthalocyanine, PEDOT, TCNQ, PTCDA, NTCDA, PTCDI, NTCDI, C60 and C70, Alq3, Ir (ppy) 3 BCP, TPD and NPD; an oxide such as ITO; and a diode or transistor containing, metals such as aluminum, magnesium, gold and silver. A thinner and smaller discharge circuit can be reduced into practice by providing a discharge circuit with the organic semiconductor layer. It is desirable that the discharge circuit 210 contains a schottky diode constructed with an organic semiconductor and metal, and an organic light emitting diode layer. The configuration can be simpler by providing the discharge circuit 210 in a schottky diode layer so that cost reduction can be achieved.

The schottky diode was constructed with pentacene, an acenic material provided, on the gold as a semiconductor layer, and furthermore, on top of the layer, silver or aluminum was provided. If the semiconductor layer, the aluminum and silver are joined in Schottky junction, materials not limited to these.

For example, the organic light-emitting material was laminated with hole transport materials such as TPD and NPD on the gold, light-emitting materials such as Alq3 and Ir (ppy)3, electron conduction materials such as BCP, and metals such as aluminum, and silver in that order. Hole injection can be made between the gold and hole transport materials, and electron injection is made between the aluminum and BCP. If the hole injection and electron injection are made into the layer of light-emitting materials, light is generated, and material combinations are not limited to these.

The transistor was laminated with pentacene, an acenic material, provided on the gold as a source electrode, materials such as mesh aluminum and silver as gate electrode, pentacene, the gold of the drain electrode in that order. The transistor voltage is applied to join the gate electrode and pentacene, which changes the resistance between the two gold electrodes by changing the thickness range of the depletion layer in the pentacene, which illustrates the SIT structure by an example. If the SIT structure enables ohmic junction in the source and drain electrodes, and Schottky junction in the gate electrode, materials are not limited to these. Also, MOSFET structure, JFET structure, bipolar transistor structure can be created.

In addition, the discharge circuit 210 is provided with luminous elements 233, 234 which produce luminescence by the electric current that flows when discharging the electric cell 150. A light sensor 503 (FIG. 3) that responds to the emission of light can be installed in the vicinity of the luminous elements 233, 234. Constant current circuits 235, 236 may be provided in the discharge circuit 210 because the luminous elements 233, 234 may be broken if the electric current is too high that flows through the luminous elements. In some embodiments, elements, such as MOSFETs, JFETs, and MSSFETs, are used as elements to provide the constant current circuit.

Descriptions of the desirable embodiment in the case of use of luminous elements 233 and 234 follows. In the embodiment, especially, the electrode is not developed without using the inkjet method; around the electrode to which the positive-electrode layer 269 and negative-electrode layer 261 are applied on both surfaces of a current collecting foil 260 prepared with a normal method, and on both surfaces of the electrode, each constant current circuit (including the zener diode 231,232) 235,236, the luminous element 233,234 are developed. Electrical connections between the adjacent constant current circuits and the luminous elements 233,234 are produced using conductive binding materials as will hereinafter be described.

It is desirable that the luminous element is developed on the surface of the electrode 260 in an elongated shape. The luminous element emits much light in a direction perpendicular to the battery surface, and the light is taken out at the side end of the battery by a light guiding device arranged between the luminescent device and an end of the batter cell. Therefore, the light emitted far from the side is absorbed along the way so that the light is hard to be taken out if the luminous element is placed far from the side end of the battery. It is desirable that the luminous element is developed on the surface of the battery in an elongated shape. In the embodiment, it is desirable that the length is less that 10 mm, and the area of the area is less than 1% of the whole battery.

A detailed description of the periphery of the luminous elements 233 and 234 follows. A conductive sealing agent 501 is a high-polymer material containing conductive particles, and the conductive particles containing metal conductive particles are desirable so as to form a reflective layer. A sealing agent 502 is composed of nonconductive high-polymer materials, which is transparent. Refer to FIG. 12, which is a cross-section of A surface of FIG. 11.

Figure 10:
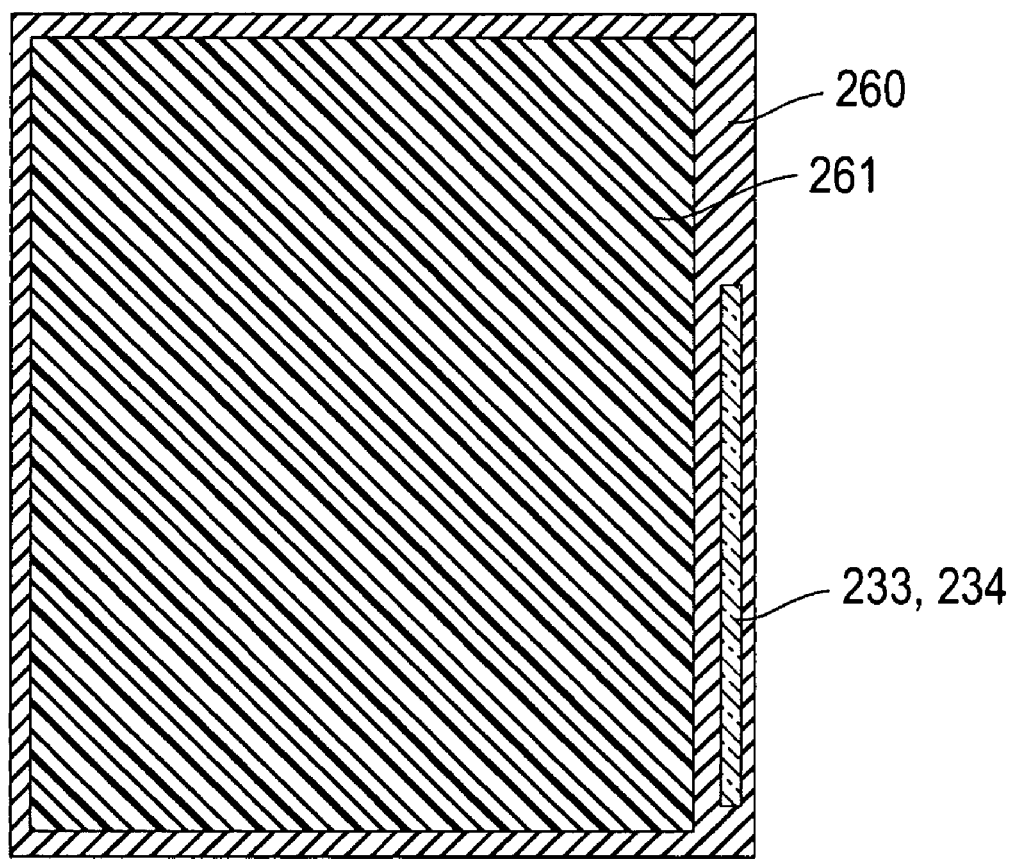
FIGS. 10-12 are exemplary diagrams illustrating a luminous element built into a bipolar battery cell.
Figure 11:
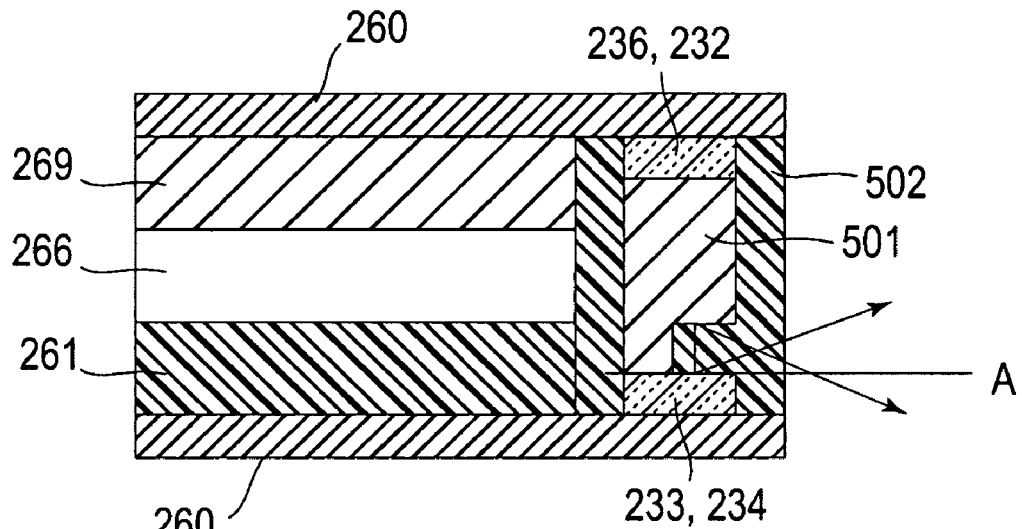
Figure 12:
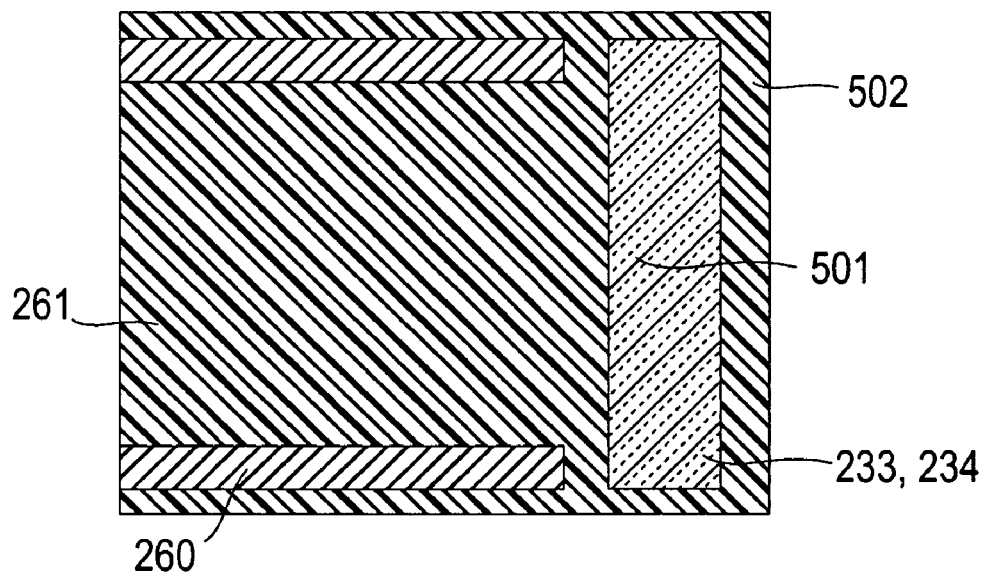

Embodiments in FIGS. 10, 11 and 12 show that the light emitted from the luminous elements 233,234 can be lead to the surface of the battery via the sealing agent 502 since the conductive sealing agent 501 and the sealing agent 502 contact with the luminous elements 233,234. Furthermore, the light can be more preferably lead to the surface of the battery by spreading the conductive sealing agent 501 close to the electrode layer since the conductive sealing agent 501 works as a light reflector. In addition, the resistance value of the layer of the conductive sealing agent to connect the luminous elements 233,234 is used as the resistance of the luminous elements 233,234. The battery voltage may rise to 10 V, so the resistance value is desirable to be higher than 10 Ω/cm2 since the luminous elements 233,234 are endurable up to 1 A/cm2.

The bipolar electrode 220, the ion conduction material 208, the discharge circuit 210, and the light sensor are covered and closely sealed with the laminated film (light reflective) as a sheathing material 180. As shown in FIG. 1, the circumference of the laminated film 180 is heat-sealed with the positive electrode tab 120A, the negative electrode tab 120B, and the voltage detecting wire 140 drawn out. When the luminous elements provided in the discharge circuit 210, 233, 234 emit light, if the voltage of the electric cell exceeds the breakdown voltage and the voltage becomes negative below the forward voltage of the zener diode with a reversed charge; the light is reflected inside the laminated film so as to be detected by the light sensor. Abnormalities are inspected outside so that charge and discharge of the battery cell, for example, can be stopped. Therefore, the installation location of the light sensor can be anywhere inside the laminated film as long as the emission of light from the luminous elements 233,234 can be detected. Furthermore, excess voltage of any of the electric cells 150 which creates a power generating element 160 with signals from the light sensor can be detected.

Although, discharge circuit 210 is described with respect to having a light sensor and the luminous elements 233, 234, the discharge circuit can be without the light sensor being installed and the luminous elements may or may not be provided.

Figure 5:
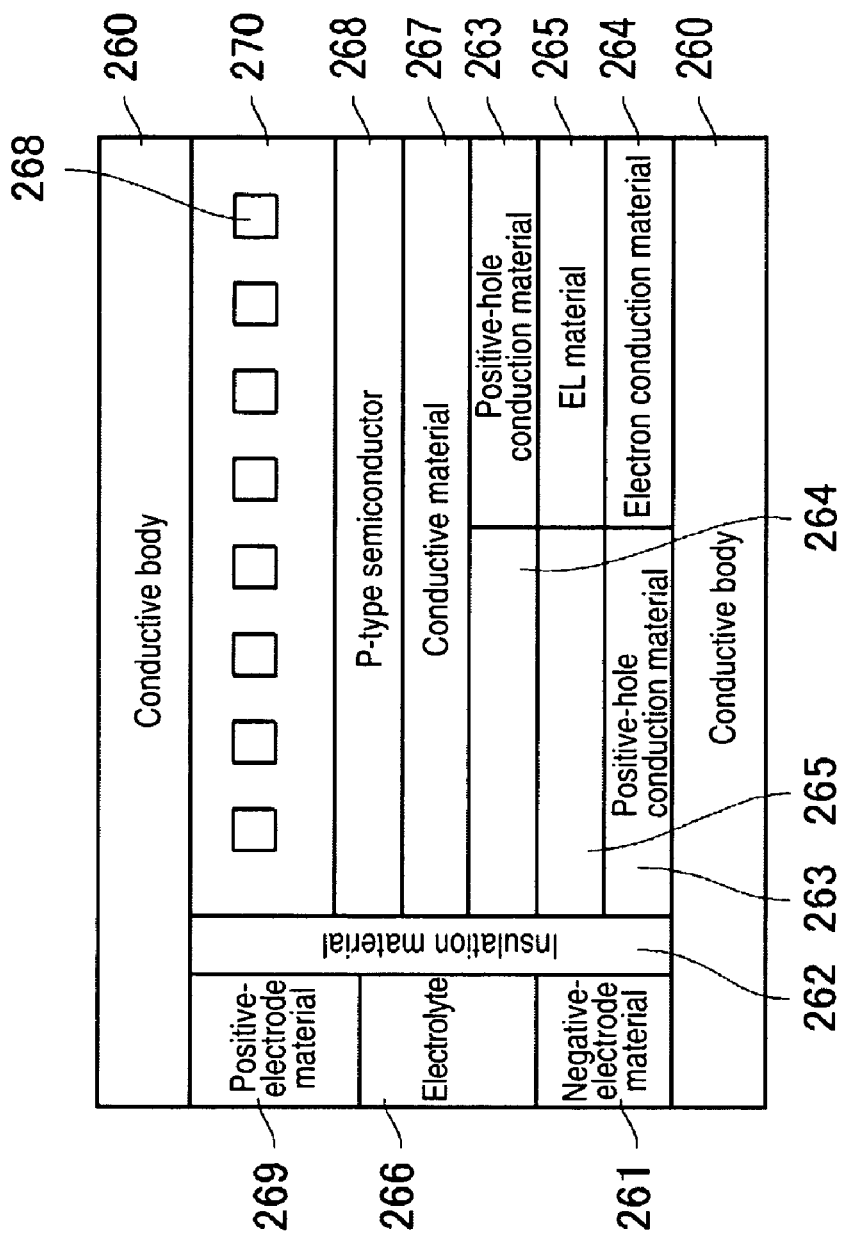

As shown in FIG. 4, the discharge circuit 210 may be provided on the same surface as the ion-conductive layer on which the ion conduction material 208 is printed, as shown in FIG. 2. In addition, the discharge circuit 210 may be provided with printing technologies. One exemplary layer structure of the discharge circuit 210 is shown in FIG. 5. Various printing technologies may be used, including an inkjet printing method.

As shown in FIG. 5, on the conductive body 260, a negative-electrode material 261, an insulation material 262, a positive-hole conduction material 263, and an electron conduction material 264 are injected according to the predefined adhesion patterns. When the thicknesses of the positive-hole conduction material 263 and the electron conduction material 264 are secured, an EL material (electroluminescence) 265 will be injected on the positive-hole conduction material 263 and the electron conduction material 264. When the thickness of the EL material 265 is secured, an electrolyte 266, the electron conduction material 264, and the positive-hole conduction material 263 will be injected according to the predefined adhesion patterns. When the thickness of the electron conduction material 264 and the positive-hole conduction material 263 are secured, a conductive material 267 will be injected on the positive-hole conduction material 263 and the electron conduction material 264. When the thickness of the conductive material 267 has been secured, a p-type semiconductor 268 will be injected on the conductive material 267. When the thickness of the electrolyte 266 is secured, before the thickness of the p-type semiconductor 268 has become the predetermined value, a positive-electrode material 269 is injected instead of the electrolyte 266. When the thickness of the p-type semiconductor 268 has become the predetermined value, an n-type semiconductor 270 and a metal (portions boxed in the figure) are injected on the p-type semiconductor 268 according to the predefined adhesion patterns. Finally, the discharge circuit is provided by injecting the conductive body 260.

In FIG. 5, the luminescent layer, in other words, the luminous device (light-emitting diode) 233 or 244, is composed of a layered product of the positive-hole conduction material 263, the EL material, and the electron conduction material 264. The zener diode layer, in other words, the zener diode 231 or 232, is developed by the p-type semiconductor 268 and the n-type semiconductor 270. The portion where p-type semiconductor 268 is developed inside the n-type semiconductor 270 is the constant current circuit 235 or 236. Furthermore, a p-type semiconductor layer or a metal layer is developed on an n-type semiconductor layer of the zener diode 231 or 232, giving a streaked appearance. The metal layer is connected to the p-type semiconductor layer outside.

In one embodiment, the contact area between the discharge circuit 210 and the bipolar cell 150 is more than 0.06 mm$^2$ per battery capacity of the relevant bipolar battery cell 150. Thus, the contact area may be determined per battery capacity. For example, a battery which discharges 50% of its electricity by self-discharge will eventually discharge 0.7 mA per 1 Amp-hour (Ah). In this case, the battery cannot be left uncharged for one month. Therefore, it will have to be replaced. In an attempt to recover the voltage balance three times as fast as that of the self-discharge, the lower discharge current of the voltage balancing function will need to be 2 mA in the discharge circuit 210, which is three times higher than the self-discharge current. The permissible heating value of PN junction for semiconductors is typically 120 mw per 1 mm$^2$. If the battery voltage is 3.5 V, the required area of the discharge circuit will be 0.06 mm$^2$ per battery of 1 Ah.

Thus, if enough discharge current is secured under actual-use conditions, and the heating value in the discharge circuits is optimized, the area of the discharge circuit 210 can be reduced.

Figure 6B:
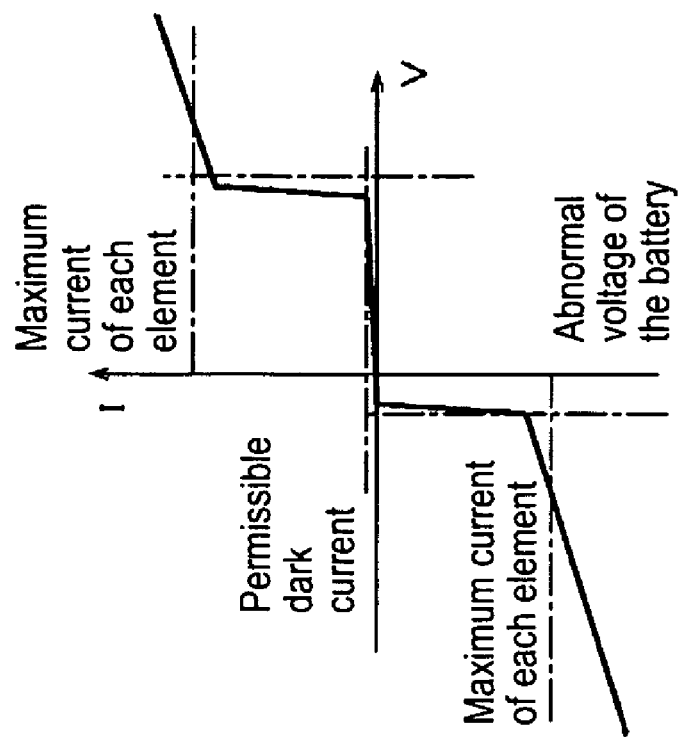
Figure 6A:
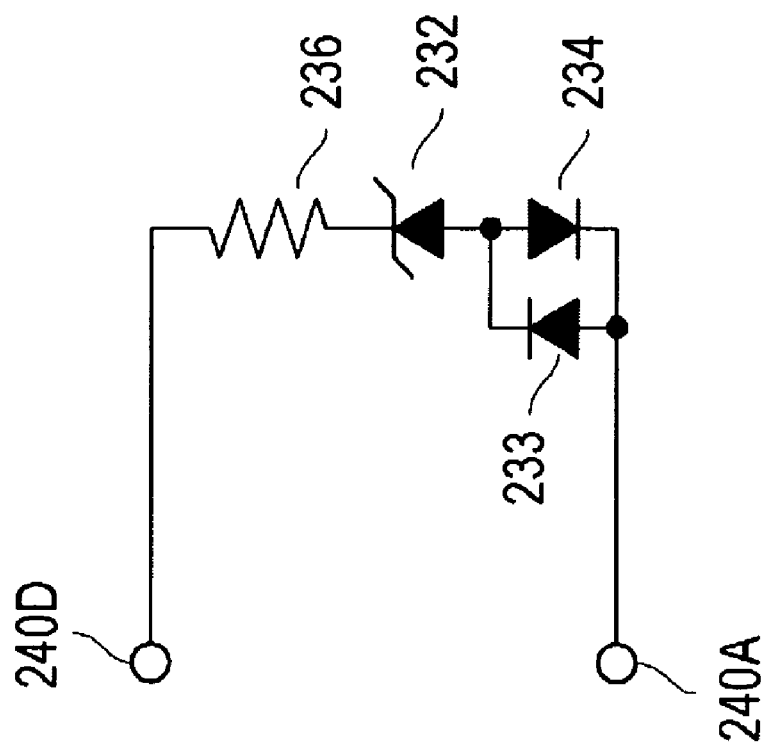
Figures 7A, 7B:
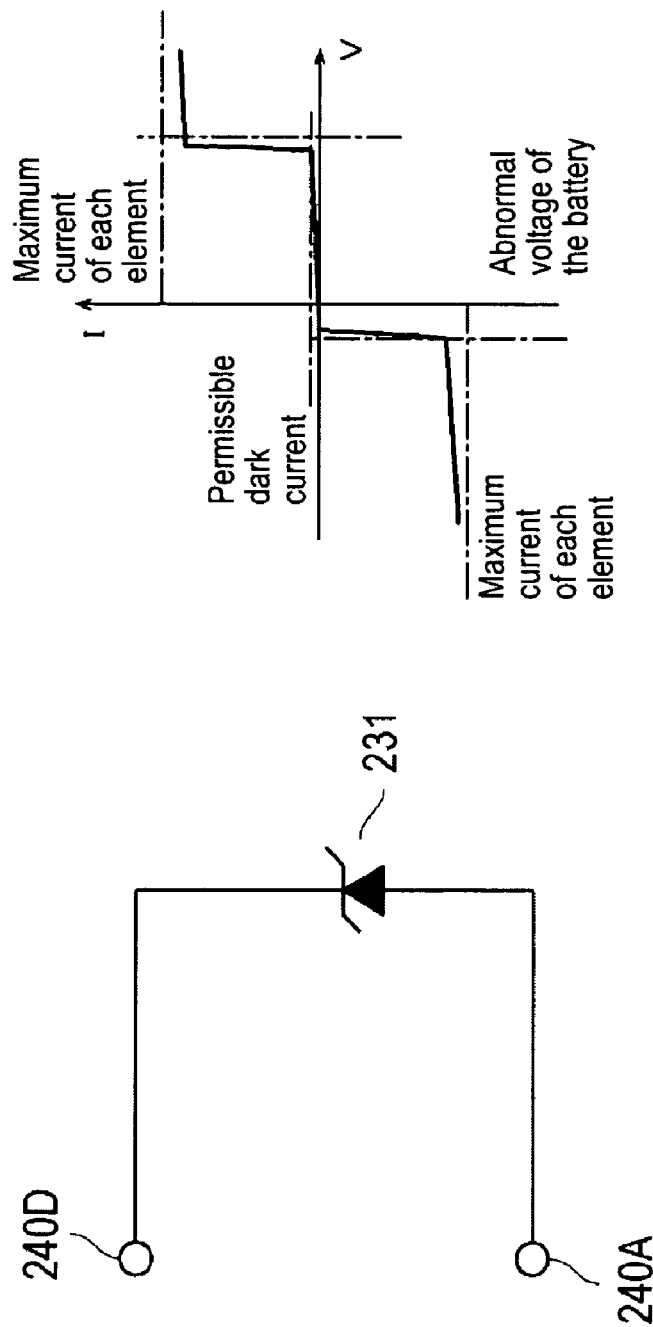

An abnormal voltage detecting circuit which composes the discharge circuit 210 and a voltage balancing circuit together with their discharging characteristics are shown in FIGS. 6 and 7. The abnormal voltage detecting circuit has a property where if the voltage of the electric cell 150 exceeds the predetermined threshold of the discharge voltage (abnormal voltage of the battery), the current will increase according to the voltage value. On the one hand, it also has a property where if the voltage is under the threshold of the discharge voltage, almost no electric current will not flow (permissible dark current). When the voltage exceeds the threshold, high electric current flows through the luminous elements 233,234 so as to emit light. The electric current which flows through the luminous elements 233,234 is controlled by the resistance value of a resistance unit 240, and a constant current circuit 236 is provided so as for the electric current not to exceed the permissible current of the luminous elements 233, 234 (refer to FIG. 3). Furthermore, the light sensor is installed in the vicinity of the luminous element, and a communication means for optical isolation will be established with the sensor so as to convey the information to the outside by electrical potential conversion that the luminous elements deviate from the threshold of the discharge voltage.

Figure 8:
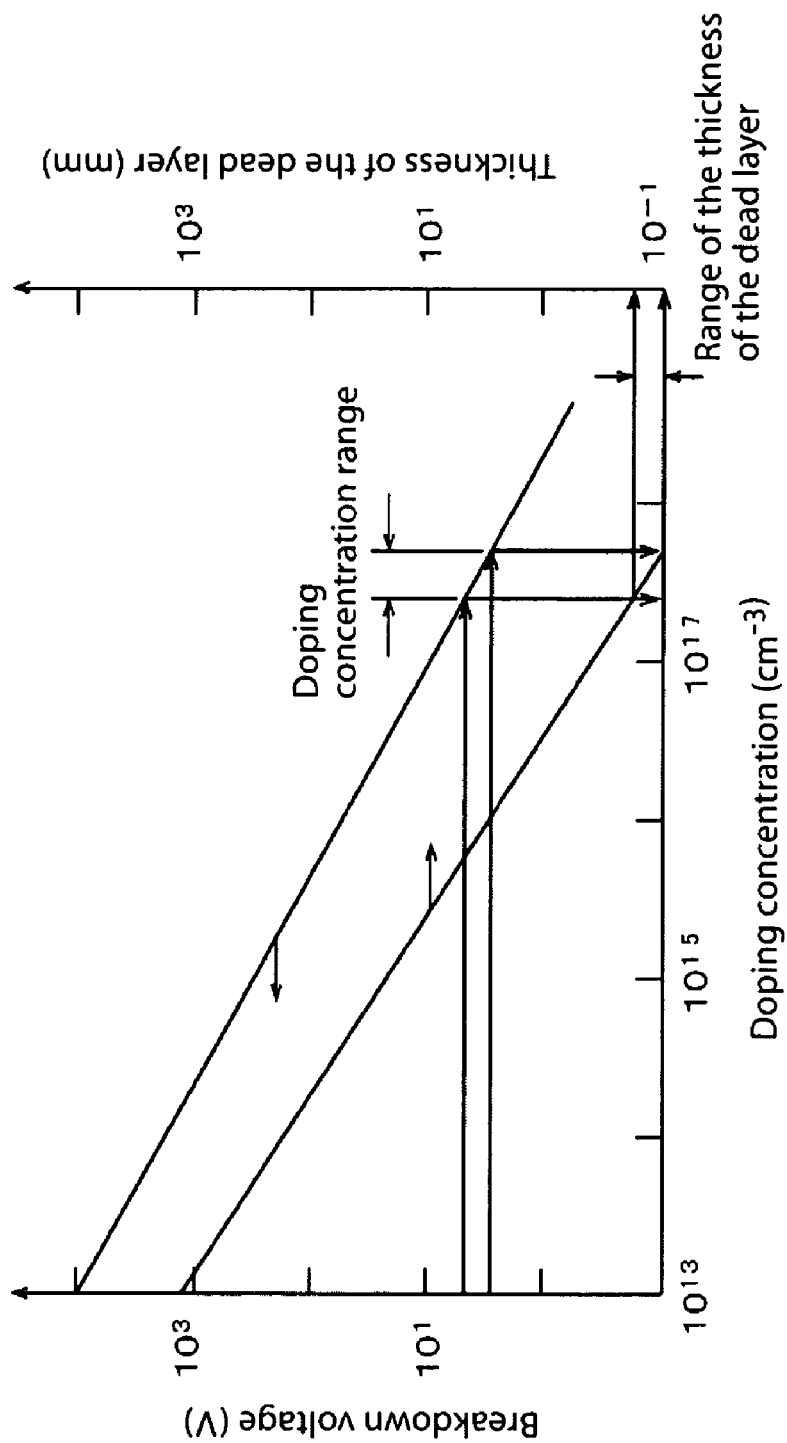

The voltage balancing circuit has a property where if the voltage of the electric cell 150 exceeds the predetermined threshold of the discharge voltage (abnormal voltage of the battery), the current will flow through the zener diode 231 so as not to exceed the threshold of the discharge voltage. The doping concentration can be set to between $10^{17}$-$10^{18}$ and the thickness of the depletion layer between 0.1 μm-1.0 μm an so as to set the breakdown voltage of the PN-junction of the discharge circuit the same as to the relevant threshold. As shown in FIG. 8, the breakdown voltage of PN-junction for semiconductors is determined based on the doping concentration and the thickness of the depletion layer only. Therefore, the required doping concentration and the thickness are determined according to the figure. If the properties of the zener diode 231, 232 are optimized, dark current of the discharge circuit 210 can be reduced, and overdischarge of batteries can be avoided while left uncharged for long periods so that reliable batteries can be supplied.

In the mode for carrying out the invention, the breakdown voltage can be controlled with the thickness of a punch through region by providing the punch through region with low doping concentration in the PN-junction at 0.5 μm or less and by laminating the zener diodes 231,232 on the conductive material 267, laminating the p-type semiconductor on top of it, and furthermore laminating the n-type semiconductor 270 on top of it. This way, the original battery capacity can be made use of as much as possible because the batteries will be discharged slowly until it reaches the breakdown voltage of diodes. The breakdown voltage will be equalized with a high degree of accuracy, and the voltage of the batteries placed in series will be equalized. At the same time, the breakdown voltage can be controlled by adjusting the doping concentration of p-type and n-type layers without providing regions with the low the doping concentration.

Figure 9:
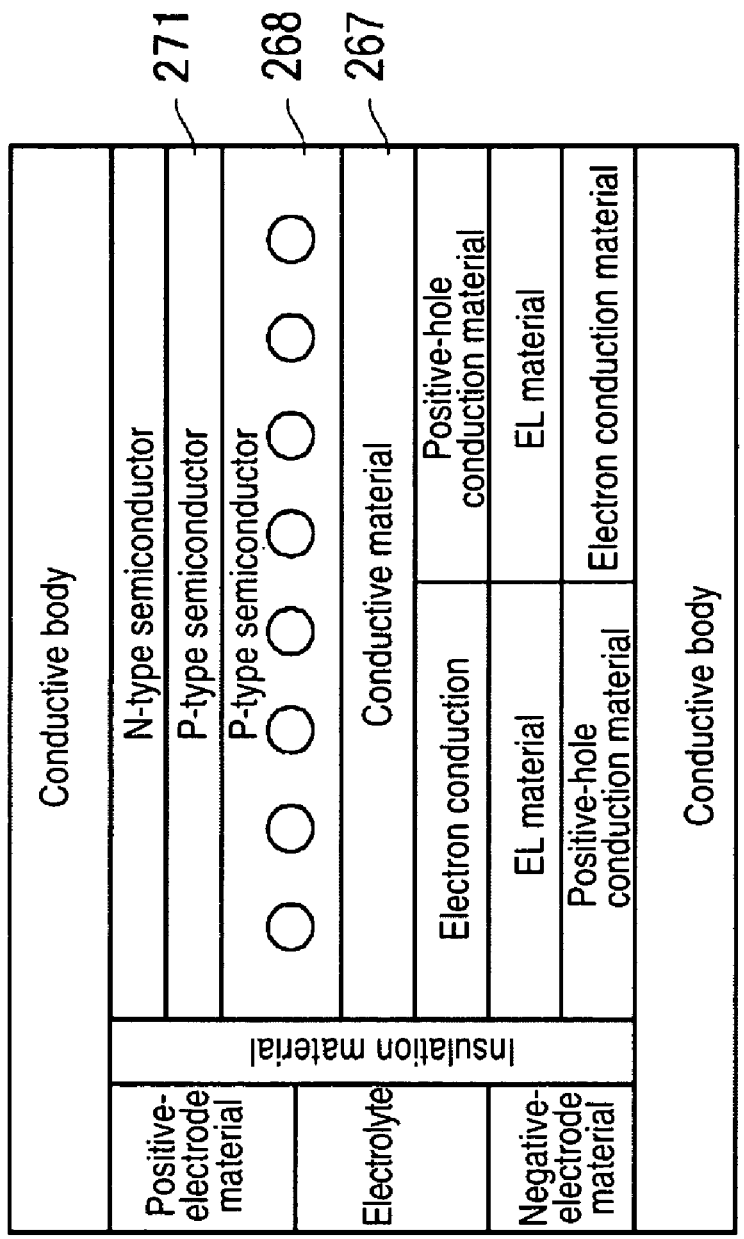

Another embodiment of the discharge circuit 210 is shown in FIG. 9, but the difference from FIG. 5 is just the layer structure of the portion that constructs the constant current circuit. It only differs in that the p-type semiconductor layer is laminated on the conductive material 267, the n-type semiconductor layer is laminated on the p-type semiconductor layer, or a metal layer is developed giving a streaked appearance, and on top of the layer, the p-type semiconductor 271 is laminated, and furthermore, on top of the layer, the n-type semiconductor is laminated.

Functions as the abnormal voltage detecting circuit and the voltage balancing circuit, as stated above, can be provided with the discharge circuit 210 even with this kind of layer structure.

In one embodiment, the bipolar battery can automatically balance the charged conditions without requiring that voltage detecting wires and bypass wires be drawn out. Work efficiency for manufacture and the reliabilities of the battery can be improved because the discharge circuit is provided so as to be sandwiched between each electric cell.

As described above, the bipolar battery cell can be used to form a battery module 250 (refer to FIG. 13) with a plurality of bipolar battery cells connected in series or in parallel. Furthermore, the bipolar battery cell can be used to form an assembled battery 300 with a plurality of the battery modules 250 connected in series or in parallel.

Figure 13A:
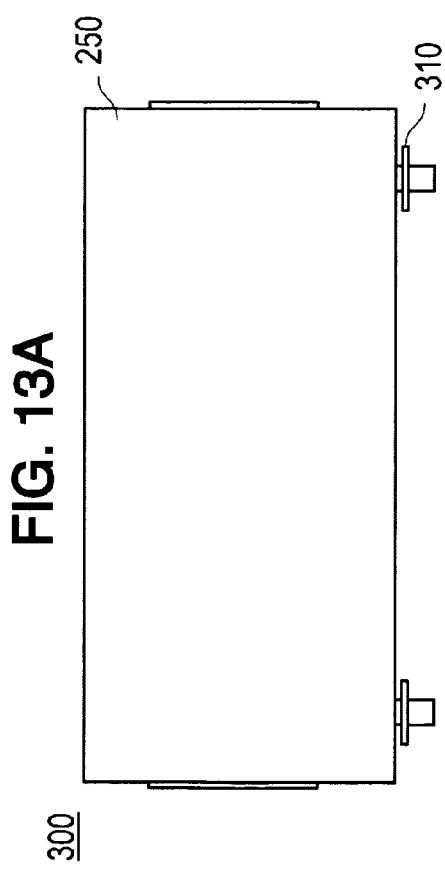
FIGS. 13A-13C are schematic illustrations of the interior of an assembled battery.
Figure 13C:
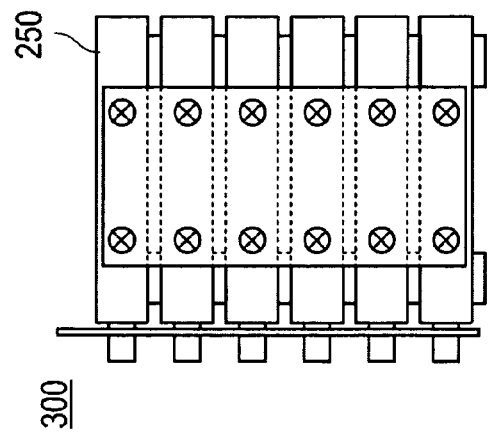
Figure 13B:
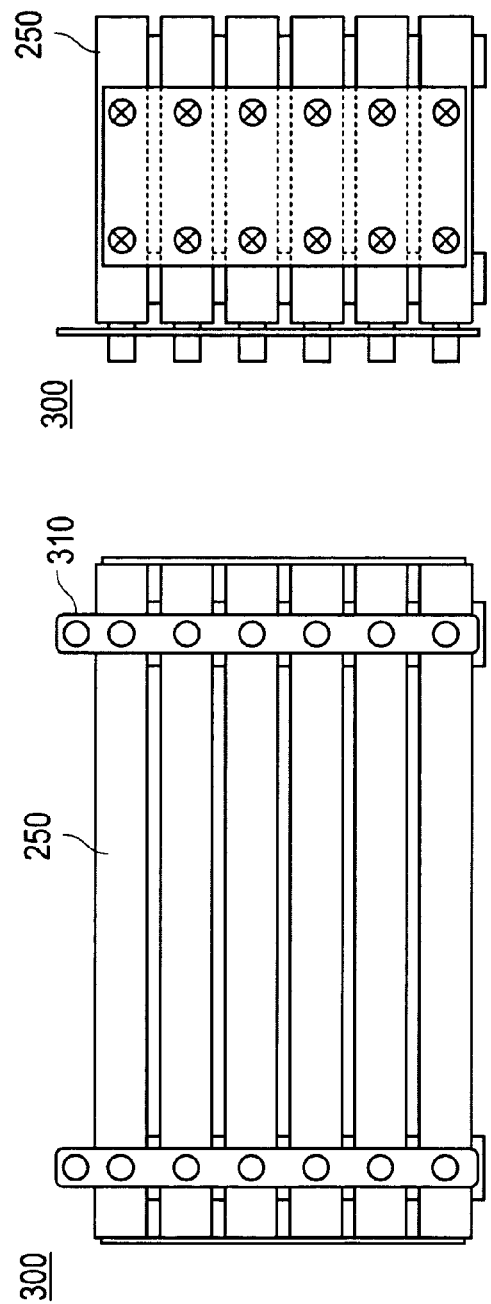

FIG. 13 shows a top view (FIG. 13A), an elevation view (FIG. 13B), and a lateral view (FIG. 13C) of the assembled battery 300. Each of the battery modules 250 is connected with each other with electrical connecting means such as a bus bar, and the assembled battery module 250 is stacked with a plurality of battery modules with a connection jig 310. With respect to how many bipolar battery cells shall be connected so as to create the assembled battery module 250, or how many modules are stacked so as to create the assembled battery 300, it will depend on the battery capacity or power output of the vehicle being equipped with the bipolar battery assembly.

Thus, the assembled battery 300 with a plurality of the battery modules 250 connected in series or in parallel can assure high capacity and power output, and a long-last reliability as an assembled battery 300 can be maintained because each battery module 250 is reliable. In addition, even if part of battery module 250 is broken, it can be repaired by replacing the failed parts only.

In the case of the assembled battery 300, the charged conditions will be unbalanced if self-discharge is accelerated due to a minimum short circuit in a bipolar battery cell 100 because a plurality of bipolar battery cells 100 are connected in series. When a bipolar battery cell with 0% of the charged condition, and a bipolar battery cell with 100% of the charged condition are connected in series, if one of the bipolar battery cells over charge and over discharge, the other bipolar battery cell will overcharge so that the electric current can not flow. The bipolar battery cell described herein has a built-in discharge circuit which can automatically balance the charging and service capacities; and can improve the reliability and durability as an assembled battery. In addition, the assembled battery can be downsized because the device will not be needed outside which balances the charged conditions.

Figure 14:
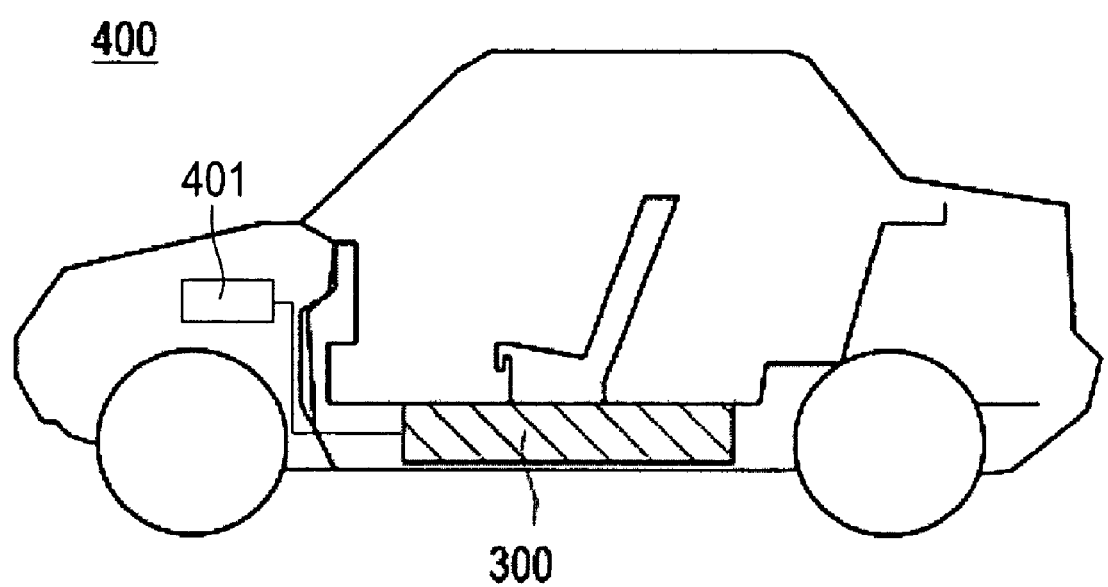
FIG. 14 illustrates an assembled battery equipped in a vehicle.

The assembled battery 300 may be installed under the seat in the central area of an electric automobile 400, as shown in FIG. 14. If the assembled battery is installed under the seat, in-vehicle space and luggage room can be increased. Furthermore, the assembled battery 300 can be installed not only under the seat, but also under the rear luggage room or in an engine compartment in the front of the vehicle. An electric automobile 400 equipped with the assembled battery 300 as above stated is extremely durable, and can produce an enough output even after use for a long period. Furthermore, an electric automobile and a hybrid vehicle with excellent fuel efficiency and traveling performance can be supplied. Additionally, an assembled battery controller 401 determines that the charged conditions are being balanced when the light sensor 503 (FIG. 3) is receiving light so that the life of the assembled battery can be extended by limiting the output.

In addition, not just the assembled battery 300, but the battery module 250 alone can be installed depending on what is desired. Or, both the assembled battery 300 and battery module 250 can be installed in combination. Moreover, example vehicles in which the assembled battery or the battery module can be installed include an electric automobile and a hybrid vehicle as above stated, but use of the battery module and assembled battery is not limited to these vehicles.

In this manner, the described bipolar battery cell may more readily be mass-produced, and reliability of the bipolar battery cell may be improved because the assembled battery can automatically balance the charged conditions depending on the voltage of each electric cell without requiring that voltage detecting wires and bypass wires be drawn out.

Various embodiments of the invention have been described. These and other embodiments are within the scope of the following claims.

The invention claimed is:

1. A bipolar battery cell comprising:
   a plurality of electric cells, each electric cell comprising:
      a bipolar electrode including a collector having a positive-electrode layer on one surface and a negative-electrode layer on an opposing surface;
      an electrolyte layer that exchanges ions between the positive-electrode layer and the negative-electrode layer;
      a discharge circuit printed in the electrolyte layer within each electric cell, the discharge circuit configured to electrically balance charge conditions of adjacent electric cells;
      a first pair of conductive bodies located in the electrolyte layer, wherein one body of the first pair is in contact with one side of the discharge circuit and another body of the first pair is in contact with an opposing side of the discharge circuit; and
      a second pair of conductive bodies, wherein one body of the second pair of conductive bodies is in the negative-electrode layer and another body of the second pair is in the positive-electrode layer such that each body of the second pair of conductive bodies is vertically aligned with a different body of the first pair of conductive bodies when the negative-electrode layer, the electrolyte layer and the positive-electrode layer are stacked.

2. The bipolar battery cell of claim 1, further comprising a contact area between the discharge circuit and the electric cell within which the discharge circuit is located that is more than 0.06 mm$^2$ per battery capacity of the bipolar battery of 1 Ah.

3. The bipolar battery cell of claim 1, wherein a threshold of a discharge voltage in the discharge circuit is set between 3.6 V-4.1 V, and wherein a doping concentration is set between $10^{17}$-$10^{18}$ cm$^3$, and the thickness of a depletion layer is set between 0.1 μm-1.0 μm so as to set a breakdown voltage of a PN junction of the discharge circuit the same as to the threshold.

4. The bipolar battery cell of claim 1, wherein the discharge circuit includes a zener diode layer.

5. The bipolar battery cell of claim 1, wherein the discharge circuit includes a luminescent device.

6. The bipolar battery cell of claim 5, further comprising a light guiding device arranged between the luminescent device and an end of the battery cell.

7. The bipolar battery cell of claim 5, further comprising a light sensor that responds to light emitted from the relevant luminescent device.

8. The bipolar battery cell of claim 7, wherein the discharge circuit includes a constant current circuit.

9. The bipolar battery cell of claim 8, further comprising a sheathing material that covers and seals the bipolar electrodes, the electrolyte layers, the discharge circuit, and the light sensor.

10. The bipolar battery cell of claim 1, further comprising a sheathing material that covers and seals the bipolar electrodes, the electrolyte layers, and the discharge circuit.

11. The bipolar battery cell of claim 1, further comprising an insulant printed on an outermost periphery of each of the positive-electrode layer, the negative-electrode layer and electrolyte layer.

12. An assembled battery comprising a plurality of bipolar battery cells, wherein each bipolar cell comprises a plurality of electric cells, each cell comprising:
a laminated bipolar electrode including a collector having a positive-electrode layer on one surface and a negative-electrode layer on an opposing surface;
an electrolyte layer that exchanges ions between the positive-electrode layer and the negative-electrode layer;
a discharge circuit printed in the electrolyte layer that electrically balances charged conditions of adjacent bipolar electrodes;
a first pair of conductive bodies located in the electrolyte layer, wherein one body of the first pair is in contact with one side of the discharge circuit and another body of the first pair is in contact with an opposing side of the discharge circuit; and
a second pair of conductive bodies, wherein one body of the second pair of conductive bodies is in the negative-electrode layer and another body of the second pair is in the positive-electrode layer such that each body of the second pair of conductive bodies is vertically aligned with a different body of the first pair of conductive bodies when the negative-electrode layer, the electrolyte layer and the positive-electrode layer are stacked.

13. A vehicle comprising:
a controller; and
an assembled bipolar battery comprising a plurality of bipolar batter cells, wherein each bipolar battery cell comprises a plurality of electric cells, each electric cell comprising:
a bipolar electrode including a collector having a positive-electrode layer on one surface and a negative-electrode layer on an opposing surface;
an electrolyte layer that exchanges ions between the positive-electrode layer and the negative-electrode layer;
a discharge circuit printed in the electrolyte layer that electrically balances charged conditions of adjacent bipolar electrodes;
a first pair of conductive bodies located in the electrolyte layer, wherein one body of the first pair is in contact with one side of the discharge circuit and another body of the first pair is in contact with an opposing side of the discharge circuit; and
a second pair of conductive bodies, wherein one body of the second pair of conductive bodies is in the negative-electrode layer and another body of the second pair is in the positive-electrode layer such that each body of the second pair of conductive bodies is vertically aligned with a different body of the first pair of conductive bodies when the negative-electrode layer, the electrolyte layer and the positive-electrode layer are stacked.

14. A method of forming a bipolar battery cell, each bipolar battery cell comprising a plurality of electric cells, each electrical cell comprising a bipolar electrode, the method comprising;
stacking a collector having a positive-electrode layer with a conductive body on one surface of the collector and a negative-electrode layer having another conductive body on an opposing surface of the collector, with an electrolyte layer that exchanges ions between the positive-electrode layer and the negative-electrode layer, the electrolyte having a discharge circuit therein, wherein the discharge circuit is contacted on opposing sides with additional conductive bodies in the electrolyte layer and electrically balances charged conditions of adjacent bipolar electrodes to form each electric cell of the plurality of electric cells; and
wherein stacking the collector with the positive-electrode layer and negative-electrode layer with the electrolyte layer occurs such that each body of the conductive bodies in the electrolyte aligns with a different conductive body in adjacent layers.

15. A bipolar battery cell comprising;
a plurality of electric cells, each cell comprising:
a bipolar electrode including a collector having a positive-electrode layer on one surface and a negative-electrode layer on an opposing surface;
means for exchanging ions between the positive-electrode layer and the negative-electrode layer;
means for balancing the bipolar battery cell by electrically balancing charge conditions of adjacent bipolar electrodes, the means for balancing printed in the means for exchanging ions;
a first pair of conductive bodies located in the electrolyte layer, wherein one body of the first pair is in contact with one side of the means for balancing and another body of the first pair is in contact with an opposing side of the means for balancing; and
a second pair of conductive bodies, wherein one body of the second pair of conductive bodies is in the negative-electrode layer and another body is in the positive-electrode layer such that each body of the second pair is vertically aligned with a different body of the first pair of conductive bodies when the negative-electrode layer, the means for exchanging ions and the positive-electrode layer are stacked.

16. The bipolar battery cell of claim 1, wherein the discharge circuit comprises an abnormal voltage detecting circuit and a voltage balancing circuit.

17. The assembled battery of claim 12, wherein the laminated bipolar electrode further includes an insulant printed on an outermost periphery of each of the positive-electrode layer, the negative-electrode layer and the electrolyte layer.

18. The vehicle of claim 13, wherein each electric cell further comprises an insulant printed on an outermost periphery of each of the positive-electrode layer, the negative-electrode layer and the electrolyte layer.

19. The method of claim 14, further comprising providing an insulant on an outermost periphery of each of the positive-electrode layer, the negative-electrode layer and the electrolyte layer prior to stacking.

20. The bipolar battery cell of claim 15, wherein each electric cell further comprises an insulant printed on an outermost periphery of each of the positive-electrode layer, the negative-electrode layer and the means for exchanging ions.

* * * * *